(12) United States Patent
Mironets et al.

(10) Patent No.: US 10,549,520 B2
(45) Date of Patent: Feb. 4, 2020

(54) WORK PIECE HAVING SELF-SUPPORTING GUSSET AND METHOD RELATED THERETO

(71) Applicant: United Technologies Corporation, Farmington, CT (US)

(72) Inventors: Sergey Mironets, Charlotte, NC (US); Lyutsia Dautova, Rocky Hill, CT (US); Joseph Ott, Enfield, CT (US); Christopher F. O'Neill, Hebron, CT (US); Robert P. Delisle, Colchester, CT (US); Jesse R. Boyer, Manchester, CT (US); Agnes Klucha, Colchester, CT (US); Louis Porretti, Plantsville, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 606 days.

(21) Appl. No.: 15/287,776

(22) Filed: Oct. 7, 2016

(65) Prior Publication Data

US 2017/0021606 A1     Jan. 26, 2017

Related U.S. Application Data

(63) Continuation of application No. 13/729,791, filed on Dec. 28, 2012, now Pat. No. 9,486,963.

(51) Int. Cl.
    *F01D 25/28*       (2006.01)
    *B33Y 80/00*       (2015.01)
    (Continued)

(52) U.S. Cl.
    CPC ............ *B33Y 80/00* (2014.12); *F01D 25/285* (2013.01); *F04D 29/542* (2013.01); *F16B 5/00* (2013.01);
    (Continued)

(58) Field of Classification Search
    CPC ............... F01D 25/285; F05D 2230/31; F05D 2230/53; B22F 2003/247; B22F 2003/1042; B22F 2003/1046; B22F 5/009; B22F 5/04; B29C 67/0092; B29C 67/0077; B29C 67/0074; Y10T 403/42
    (Continued)

(56) References Cited

U.S. PATENT DOCUMENTS 4,097,276 A * 6/1978 Six ........................... B22F 5/04
                                                 29/889.21
7,286,893 B1    10/2007   Mazumder
    (Continued)

*Primary Examiner* — Justin D Seabe
*Assistant Examiner* — Adam W Brown
(74) *Attorney, Agent, or Firm* — Carlson, Gaskey & Olds, P.C.

(57) ABSTRACT

A structure includes a first body section that has a wall that spans in a vertical direction. The wall has a relatively thin thickness with respect to a length and a width of the wall. A second body section is arranged next to, but spaced apart from, the first body section. A gusset connects the first body section and the second body section. The gusset extends obliquely from the wall of the first body section with respect to the vertical direction such that the gusset is self-supporting. The first body section has a geometry that corresponds to an end-use component exclusive of the gusset.

18 Claims, 3 Drawing Sheets

(51) Int. Cl.
*F04D 29/54* (2006.01)
*F16B 5/00* (2006.01)

(52) U.S. Cl.
CPC ......... *F05D 2230/31* (2013.01); *Y10T 403/42* (2015.01)

(58) Field of Classification Search
USPC .................................................. 264/113, 497
See application file for complete search history.

(56) References Cited

U.S. PATENT DOCUMENTS

| | | | |
|---|---|---|---|
| 7,497,660 B2* | 3/2009 | Liang | F01D 5/08 415/115 |
| 7,777,155 B2 | 8/2010 | Twelves, Jr. et al. | |
| 8,017,070 B2 | 9/2011 | Low et al. | |
| 8,470,234 B2* | 6/2013 | Clark | B22F 3/1055 264/109 |
| 8,703,045 B2* | 4/2014 | Mitchell | B22F 3/15 419/49 |
| 8,752,609 B2* | 6/2014 | Pickrell | B22D 19/00 164/103 |
| 2011/0241947 A1 | 10/2011 | Scott et al. | |

\* cited by examiner

US 10,549,520 B2

WORK PIECE HAVING SELF-SUPPORTING GUSSET AND METHOD RELATED THERETO

CROSS-REFERENCE TO RELATED APPLICATION

The present disclosure is a Continuation of U.S. patent application Ser. No. 13/729,791, filed Dec. 28, 2012.

BACKGROUND

Powder bed additive manufacturing, such as selective laser melting, is used to produce components in a layered manner. For instance, a turbomachine compressor vane structure is one component that can be made by powder bed additive manufacturing. The compressor vane structure may include a rail that supports numerous airfoil vanes. The compressor vane structure is produced in a horizontal orientation, where the airfoil vanes and rail are built layer by layer from a trailing edge side of the vanes up toward a leading edge side of the vanes. A support is built during the fabrication process, and the vanes and rail are fabricated on this underlying support. The support is fused to the trailing edge of the vanes but is not part of the compressor vane structure. The support is therefore later removed.

SUMMARY

A powder-derived, non-finished work piece according to an exemplary aspect of the present disclosure includes a first body section having a wall spanning in a vertical direction. The wall has a relatively thin thickness with respect a length and a width of the wall. A second body section is located next to, but spaced apart from, the first body section. A gusset connects the first body section and the second body section. The gusset extends obliquely from the wall of the first body section with respect to the vertical direction such that the gusset is self-supporting, and the first body section has a geometry corresponding to an end-use component exclusive of the gusset.

In a further non-limiting embodiment of any of the foregoing examples, the first body section is an airfoil.

In a further non-limiting embodiment of any of the foregoing examples, the first body section and the second body section are airfoils.

In a further non-limiting embodiment of any of the foregoing examples, the gusset extends at an angle of 45°±5° with respect to the vertical direction.

In a further non-limiting embodiment of any of the foregoing examples, the gusset extends at an angle of no greater than 70° with respect to the vertical direction.

In a further non-limiting embodiment of any of the foregoing examples, the gusset includes a first section and a second section oriented perpendicularly to the first section.

In a further non-limiting embodiment of any of the foregoing examples, the first section is directly connected to the first body section and the second section is directly connected to the second body section.

In a further non-limiting embodiment of any of the foregoing examples, the gusset includes a first section and a second section that are connected between each other at an angle of no greater than 140°.

In a further non-limiting embodiment of any of the foregoing examples, the thickness of the wall is 0.15 centimeters or less.

In a further non-limiting embodiment of any of the foregoing examples, the wall extends from a base end to a tip end, and the gusset extends from the tip end.

In a further non-limiting embodiment of any of the foregoing examples, the first body section and the second body section have dissimilar geometries.

A method of making a powder-derived, non-finished work piece according to an exemplary aspect of the present disclosure includes depositing multiple layers of powdered material onto one another, and joining the layers to one another with reference to computer design data which relates to a particular cross-section of a work piece that is to be produced. The joining of the layers forms a first body section which includes a wall spanning in a vertical direction and has a relatively thin thickness with respect a length and a width of the wall, a second body section next to, but spaced apart from, the first body section, and a gusset that connects the first body section and the second body section. The gusset extends obliquely from the wall of the first body section with respect to the vertical direction such that the gusset is self-supporting, and the first body section has a geometry which corresponds to an end-use component exclusive of the gusset.

In a further non-limiting embodiment of any of the foregoing examples, the first body section and the second body section are airfoils.

In a further non-limiting embodiment of any of the foregoing examples, the gusset includes a first section and a second section oriented perpendicularly to the first section.

In a further non-limiting embodiment of any of the foregoing examples, the gusset includes a first section and a second section that are connected between each other at an angle of no greater than 140° maximum.

In a further non-limiting embodiment of any of the foregoing examples, the wall extends from a base end to a tip end, and the gusset extends from the tip end.

A method of controlling distortion in a powder-derived, non-finished work piece according to an exemplary aspect of the present disclosure includes providing a work piece with a first body section that includes a wall spanning in a vertical direction and having a relatively thin thickness with respect a length and a width of the wall, and a second body section next to, but spaced apart from, the first body section. The first body section is then reinforced to limit distortion thereof by providing a gusset connecting the first body section and the second body section together. The gusset extends obliquely from the wall of the first body section with respect to the vertical direction such that the gusset is self-supporting. The first body section has a geometry corresponding to an end-use component exclusive of the gusset.

A further non-limiting embodiment of any of the foregoing examples includes limiting distortion of the first body section using the gusset during a post-powder processing process.

In a further non-limiting embodiment of any of the foregoing examples, the post-powder processing process is selected from the group consisting of thermal stress relieving, hot isostatic processing, solution heat treating, aging heat treating, grit blasting and combinations thereof.

A further non-limiting embodiment of any of the foregoing examples includes removing the gusset after the post-powder processing process.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Powder bed additive manufacturing, such as selective laser melting, can be used to produce components, such as turbomachine components. Due to thermal gradients and other factors in the powder bed, the orientation in which the component is produced in the bed influences the properties and quality of the component. For example, HPC (high pressure compressor) Stators having a rail that supports numerous airfoil vanes can be produced in a horizontal orientation, layer by layer, from a trailing edge upwards toward a leading edge of the airfoil vanes. In the horizontal orientation, a support is required underneath the trailing edge to support the vanes as they are built layer by layer. The support structure must then be removed by machining, which can affect the quality of the airfoil vanes. Moreover, the airfoil vanes have relatively thin walls that are subject to distortion during cooling in the powder fabrication process and/or from post-powder processing processes that are used to finish the compressor vane structure. Due to the thin walls and distortion, the compressor vane structure cannot be accurately fabricated in a vertical orientation. Similarly, other thin-walled structures are also limited to being fabricated in certain orientations.

In this regard, as will be described in further detail below, compressor vane structures and other relatively thin-walled structures can be produced in a vertical orientation by using a self-supporting gusset disclosed herein. The self-supporting gusset is also produced in the fabrication process and reinforces the wall of the component to control distortion during and after the powder fabrication process.

Figure 1:
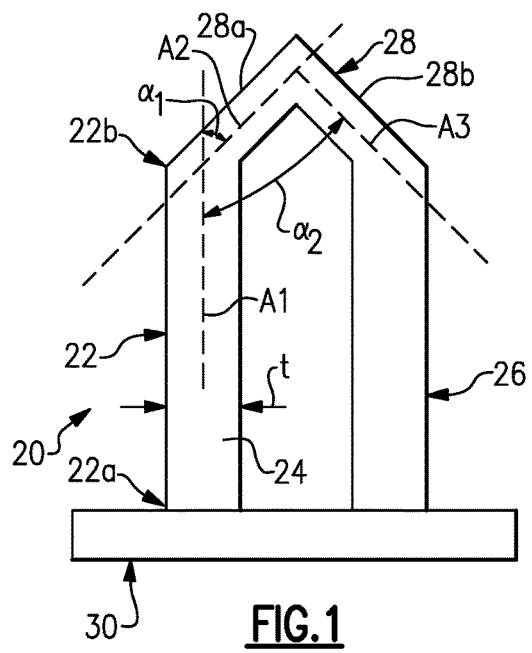
FIG. 1 illustrates an example powder-derived, non-finished work piece having a self-supporting gusset.

FIG. 1 schematically illustrates selected portions of an example powder-derived, non-finished work piece 20. As can be appreciated, although the work piece 20 can be a turbomachine vane structure, this disclosure is not limited to such structures and the examples herein can also be applied to other structures.

In this example, the work piece 20 includes a first body section 22 that has a wall 24 that spans in a vertical direction, as represented by axis A1. The wall 24 has a relatively thin thickness (t) with respect to a length of the wall along the vertical direction and a width of the wall 24 taken perpendicularly to the length and the thickness (t). In one example, the thickness (t) of the wall 24 is 0.15 centimeters or less and is thus subject to distortion from thermal cooling during powder processing and/or distortion during post-powder processing processes, such as thermal stress relieving, hot isostatic processing, solution heat treating, aging heat treating and grit blasting. Although this disclosure is not so limited, thicknesses above 0.15 centimeters tend to be less prone to distortion.

A second body section 26 is arranged next to, but spaced apart from, the first body section 22. A gusset 28 connects the first body section 22 and the second body section 26 together.

In this example, the gusset 28 includes a first section 28a that extends along a central axis A2 and a second section 28b that extends along a central axis A3. The gusset 28 extends obliquely from the wall 24 of the first body section 22 with respect to the vertical direction (axis A1) such that the gusset 28 is self-supporting. In this example, the oblique direction is represented by the axis A2, the axis A3 or both. For instance, the axis A2 of the first section 28a of the gusset 28 has an angle α1 with respect to the vertical direction (axis A1) that is 45°±5°. Similarly, the axis A3 has an angle α2 with respect to the vertical direction (axis A1) that is also 45°±5°. In other examples, the angles α1 and α2 each have a maximum angle of 70° with respect to the vertical direction (axis A1), and the angles α1 and α2 have a maximum angle of 140° with respect to each other. The angles can be changed to reduce or minimize distortion of the individual vanes and at the same time to allow for component manufacturing without a support structure.

The first section 28a of the gusset 28 is directly connected to the first body section 22 and the second section 28b of the gusset 28 is directly connected to the second body section 26. Further, in this example, the first body section 22 extends between a base 22a at base support 30 (e.g., a rail) and a tip end 22b. The gusset 28 extends from the tip end 22b of the first body section 22. As can be appreciated, the gusset can alternatively extend from other locations along the first body section 22, although placement of the gusset 28 at the tip end 22b facilitates the later removal of the gusset 28.

In fabricating the work piece 20 using powder bed additive manufacturing, such as selective laser melting, the work piece 20 is fabricated in a vertical fashion from a base 30 vertically upward toward the gusset 28. In powder bed additive manufacturing, structures that are oriented within about 45° of vertical are self-supporting while structures that are more horizontally oriented require powder-fabricated supports underneath as they are built up layer by layer. In this regard, the gusset 28, with axes A2 and A3 that form respective angles α1 and α2 that are 45°±5° to the vertical direction (axis A1), is self-supporting during the powder fabrication process.

Upon completion of the powder bed additive manufacturing process to form the work piece 20, the work piece 20 can be cooled and then further processed. During the cooling, at least the first body section 22 is subject to thermal distortion forces. The gusset 28 reinforces the first body section 22 and, in this example, also the second body section 26, to control or limit thermal distortion.

Upon full cooling, the work piece 20 can then be subjected to post-powder processing processes, as listed above. Rather than removing the gusset 28 directly after the powder fabrication, the gusset 28 is kept during the post-powder processing processes to reinforce the first body section 22 and the second body section 26, to control or limit distortion from these processes. Upon completion of any or all processes that can cause distortion, the gusset 28 is then removed, as shown in FIG. 2.

Figure 2:
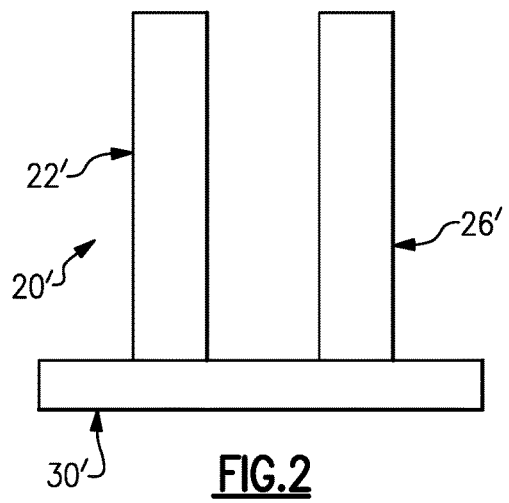
FIG. 2 a powder-derived, non-finished work piece that includes vane airfoil sections.

FIG. 2 shows a finished component 20'. As can be appreciated by comparison of FIGS. 1 and 2, the geometry of at least the first body section 22 corresponds to the finished first body section 22' of the finished component 20', exclusive of the gusset 28. In this example, the geometry of the second body section 26 and the base support 30' likewise correspond to the respective finished second body section 26' and finished base support 30'. Thus, the geometries of the first body section 22 and the second body section 26 correspond to the finished end-use component without the gusset 28. The gusset 28 serves as a processing aid but is then later removed and is thus not a part of the geometry of the finished component 20'.

Figure 3:
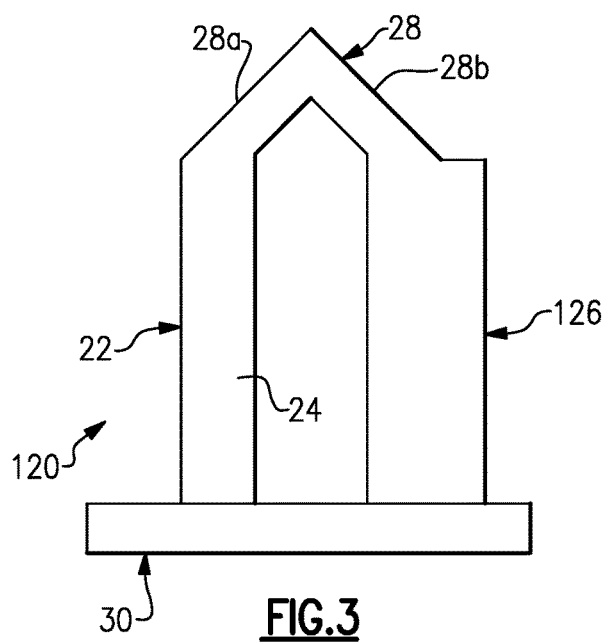
FIG. 3 illustrates a modified work piece where the second body section has a dissimilar geometry from the first body section.

As can also be appreciated from a comparison of FIGS. 1 and 2, the first body section 22 and the second body section 26 in this example have identical geometries. Alternatively, FIG. 3 shows a modified work piece 120 where the second body section 126 has a dissimilar geometry from the first body section 22. In this disclosure, like reference numerals designate like elements where appropriate in reference numerals with the addition of one-hundred or multiples thereof designate modified elements that are understood to incorporate the same features and benefits of the corresponding elements. In this example, the second body section 126 is generally larger, at least in thickness, than the first body section 22. Thus, the gusset 28 need not be between similar thin-walled sections and may instead be used, as shown in FIG. 3, between a thin-walled section (the first body section 22) and a larger section, the second body section 126 in this example.

Figure 4:
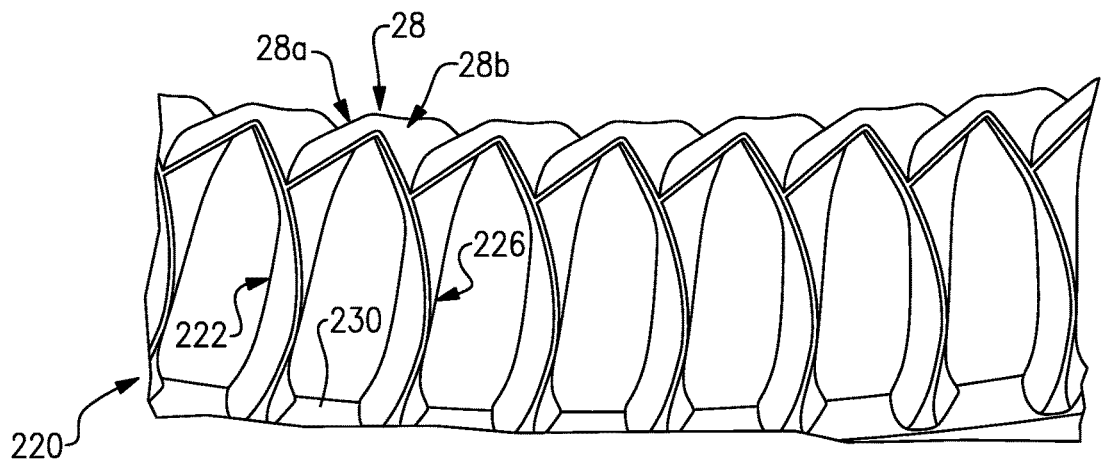
FIG. 4 illustrates a side view of another example work piece in which the first body section and the second body section are airfoil vanes that are supported on a rail.
Figure 5:
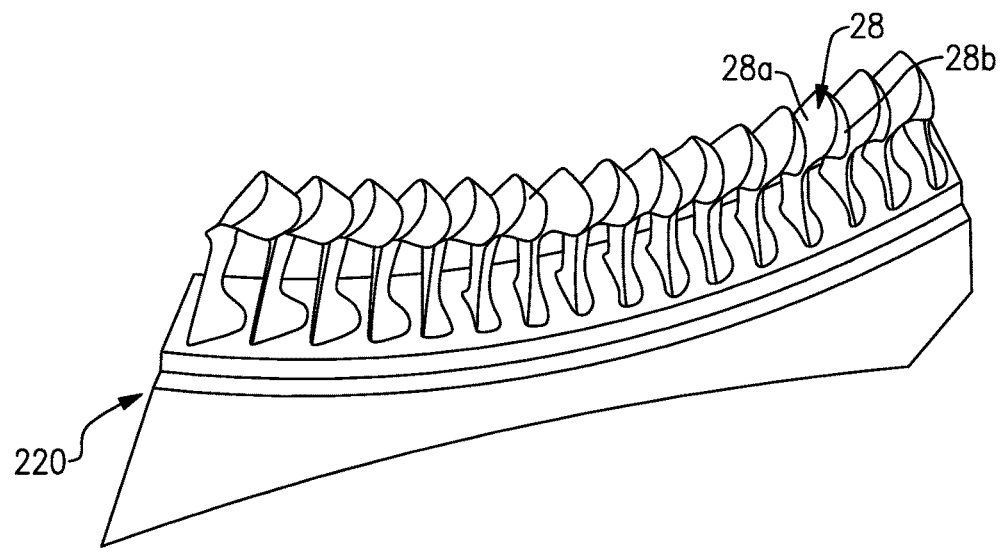
FIG. 5 is a perspective view of the work piece of FIG. 4.
Figure 6:
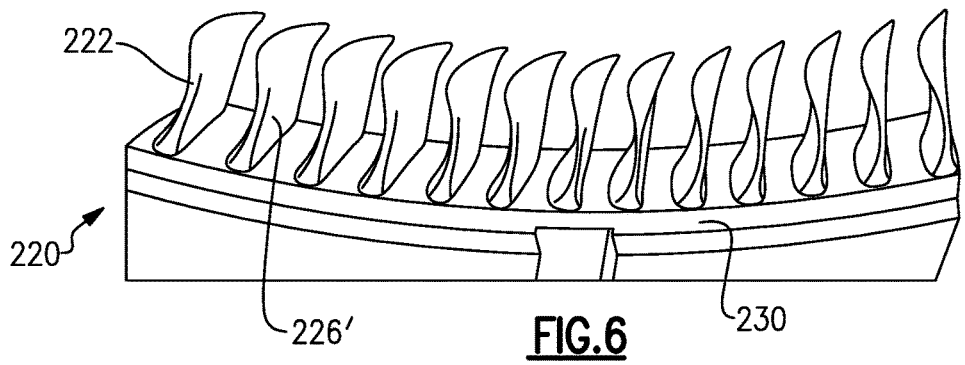
FIG. 6 is a finished stator vane structure derived from the work piece shown in FIGS. 4 and 5.

FIG. 4 shows a side view of another example work piece 220. FIG. 5 shows a perspective view of the work piece 220. In this example, the first body section 222 and the second body section 226 are airfoil vanes that are supported on a rail 230. The gussets 28 extend between adjacent airfoil vanes. As shown in FIG. 6, the gussets 28 are later removed, leaving the rail 230 and the airfoil vanes as the finished component 220'.

The gusset 28 permits airfoil vanes and similar thin-walled structures to be fabricated in the vertical direction rather than a horizontal direction from the trailing edge to the leading edge. Such structures could not previously be fabricated in such an orientation because distortion during cooling or from subsequent processes would render the components unsuitable. However, by using the gussets 28 for reinforcement during and after the powder fabrication, such components can now be fabricated in the vertical orientation. Further, building a component, such as the compressor vane structure, in the vertical orientation eliminates the need for machining the trailing edge, as is necessary with the horizontal orientation, and thus reduces fabrication cycle time and expense.

Figure 7:
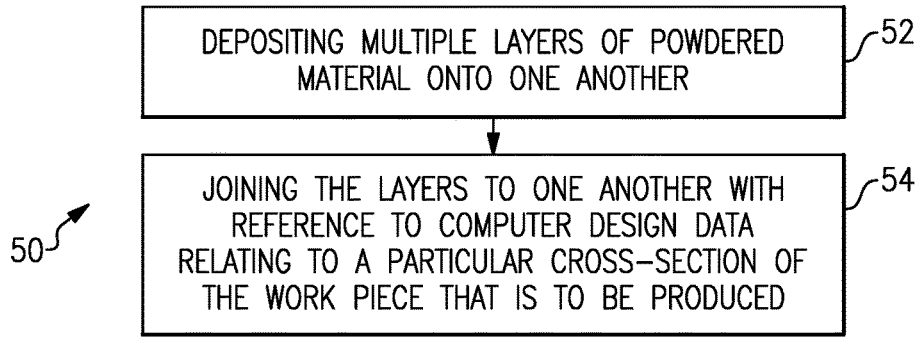
FIG. 7 shows an example method of making a powder-derived, non-finished work piece.

FIG. 7 illustrates an example method 50 of making a powder-derived, non-finished work piece, such as the work pieces 20/120/220. In this example, the method 50 includes steps 52 and 54. Step 52 includes depositing multiple layers of powdered material onto one another and step 54 includes joining the layers to one another with reference to computer design data, such as computer aided drafting data, that relates to a particular cross-section of the work piece that is being produced. The joining of the layers forms the geometry of the work pieces 20/120/220, as described above.

Figure 8:
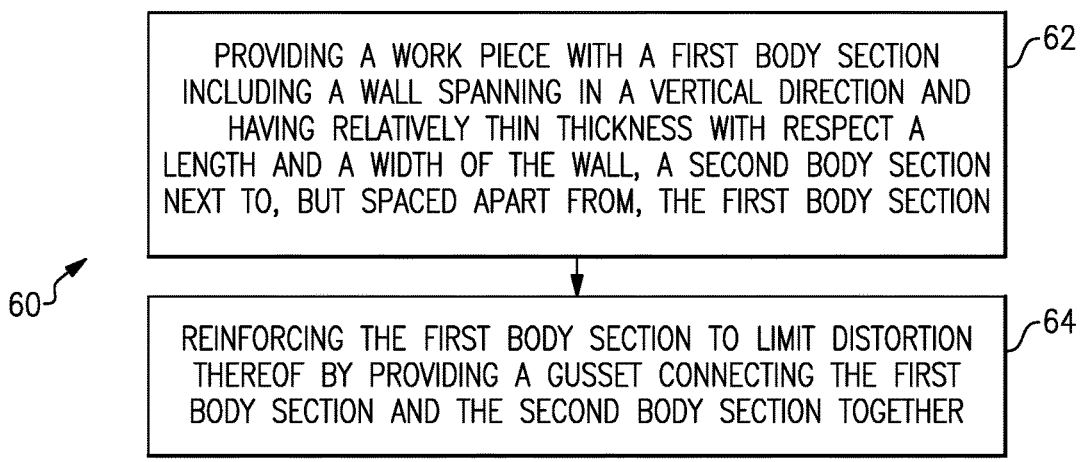
FIG. 8 shows a method of controlling distortion in a powder-derived, non-finished work piece.

FIG. 8 illustrates a method 60 of controlling distortion in a powder-derived, non-finished work piece, such as any of the work pieces 20/120/220 described herein. The method 60 includes steps 62 and 64. Step 62 includes providing a work piece with a first body section that has a wall that spans in a vertical direction and a relatively thin thickness with respect to a length and a width of the wall, and a second body section that is next to, but spaced apart from, the first body section. Step 64 includes reinforcing the first body section to limit distortion thereof by providing a gusset, such as gusset 28, connecting the first body section and the second body section together.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A structure comprising:
   a first body section including a wall spanning in a vertical direction and having a relatively thin thickness with respect a length and a width of the wall;
   a second body section next to, but spaced apart from, the first body section; and
   a gusset connecting the first body section and the second body section, the gusset extending obliquely from the wall of the first body section with respect to the vertical direction such that the gusset is self-supporting, and the first body section having a geometry corresponding to an airfoil exclusive of the gusset.

2. The structure as recited in claim 1, where the second body section is an airfoil.

3. The structure as recited in claim 1, wherein the gusset extends at an angle of 45°±5° with respect to the vertical direction.

4. The structure as recited in claim 1, wherein the gusset extends at an angle of no greater than 70° with respect to the vertical direction.

5. The structure as recited in claim 1, wherein the gusset includes a first section and a second section oriented perpendicularly to the first section.

6. The structure as recited in claim 5, wherein the first section is directly connected to the first body section and the second section is directly connected to the second body section.

7. The structure as recited in claim 1, wherein the gusset includes a first section and a second section that are connected between each other at an angle of no greater than 140°.

8. The structure as recited in claim 1, wherein the thickness of the wall is 0.15 centimeters or less.

9. The structure as recited in claim 1, wherein the wall extends from a base end to a tip end, and the gusset extends from the tip end.

10. The structure as recited in claim 1, wherein the first body section and the second body section have dissimilar geometries.

11. A structure comprising:
    a rail;
    a powder-derived airfoil spanning in a vertical direction from the rail and having a relatively thin thickness with respect a length and a width of the powder-derived airfoil;

a powder-derived body section next to, but spaced apart from, the powder-derived airfoil and also spanning in a vertical direction from the rail; and a gusset opposite the rail, the gusset connecting the powder-derived airfoil and the powder-derived body section, and the gusset extending obliquely from the powder-derived airfoil with respect to the vertical direction such that the gusset is self-supporting and resists distortion of the powder-derived airfoil.

12. The structure as recited in claim 11, where the powder-derived body section is an airfoil.

13. The structure as recited in claim 11, wherein the gusset extends at an angle of 45°±5° with respect to the vertical direction.

14. The structure as recited in claim 11, wherein the gusset extends at an angle of no greater than 70° with respect to the vertical direction.

15. The structure as recited in claim 11, wherein the gusset includes a first section and a second section oriented perpendicularly to the first section.

16. The structure as recited in claim 15, wherein the first section is directly connected to the powder-derived airfoil and the second section is directly connected to the powder-derived body section.

17. The structure as recited in claim 11, wherein the gusset includes a first section and a second section that are connected at an angle of no greater than 140°.

18. The structure as recited in claim 11, wherein the powder-derived airfoil extends from a base end at the rail to a tip end, and the gusset extends from the tip end.

* * * * *